(12) United States Patent
Woo (10) Patent No.: US 10,192,273 B2
(45) Date of Patent: Jan. 29, 2019

(54) TIME CARD PUNCHING SYSTEM (71) Applicant: ASIABASE TECHNOLOGIES LIMITED, Hong Kong (HK)

(72) Inventor: Wang Kee Woo, Hong Kong (HK)

( * ) Notice: Subject to any disclaimer, the term of this patent is extended or adjusted under 35 U.S.C. 154(b) by 157 days.

(21) Appl. No.: 15/164,858

(22) Filed: May 25, 2016

(65) Prior Publication Data

US 2017/0076400 A1  Mar. 16, 2017

(30) Foreign Application Priority Data

Sep. 16, 2015  (HK) .................................. 15109081.4

(51) Int. Cl.
| | |
|---|---|
| *G06Q 40/00* | (2012.01) |
| *H04W 4/80* | (2018.01) |
| *G06Q 10/00* | (2012.01) |
| *G06Q 10/06* | (2012.01) |
| *G06Q 10/10* | (2012.01) |
| *G06F 17/30* | (2006.01) |
| *G06F 21/46* | (2013.01) |
| *G06F 21/62* | (2013.01) |
| *G06K 9/00* | (2006.01) |
| *H04L 29/06* | (2006.01) |
| *H04L 29/08* | (2006.01) |
| *H04W 4/021* | (2018.01) |

(52) U.S. Cl.
CPC ..... *G06Q 40/125* (2013.12); *G06F 17/30259* (2013.01); *G06F 17/30268* (2013.01); *G06F 21/46* (2013.01); *G06F 21/6245* (2013.01); *G06K 9/00288* (2013.01); *G06K 9/00979* (2013.01); *G06Q 10/00* (2013.01); *G06Q 10/06* (2013.01); *G06Q 10/06398* (2013.01); *G06Q 10/10* (2013.01); *G06Q 10/107* (2013.01); *H04L 63/0428* (2013.01); *H04L 63/083* (2013.01); *H04L 63/1441* (2013.01); *H04L 67/10* (2013.01); *H04W 4/021* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 8,396,265 | B1 * | 3/2013 | Ross | G06K 9/00214 |
| | | | | 382/103 |
| 9,111,402 | B1 * | 8/2015 | Krishnan | G07C 9/00158 |
| 9,613,511 | B2 * | 4/2017 | Ghose | G08B 13/22 |

(Continued)

FOREIGN PATENT DOCUMENTS

| | | | |
|---|---|---|---|
| CN | 101685554 | * | 3/2010 |
| CN | 203054945 | * | 11/2012 |

(Continued)

*Primary Examiner* — Piotr Poltorak
(74) *Attorney, Agent, or Firm* — W&K IP (Wayne & King)

(57) ABSTRACT

A time card punching system comprising a cloud-based database, a work spot device, and a smartphone carrying a mobile application; wherein the cloud-based database, the work spot device, and the smartphone performs data communication among each other; the work spot device can be registered with designated GPS and equipped with Bluetooth smart technology; when punching a time card, the mobile application can detect if the employee is within five meters from the work spot device; the mobile application uses a face recognition to prevent buddy punching.

6 Claims, 5 Drawing Sheets

(56) References Cited

U.S. PATENT DOCUMENTS

| | | | | |
|---|---|---|---|---|
| 2004/0195314 | A1* | 10/2004 | Lee | G06Q 20/341 235/380 |
| 2006/0110145 | A1* | 5/2006 | Fujimoto | G03B 15/02 396/14 |
| 2007/0198436 | A1* | 8/2007 | Weiss | G06F 21/32 705/75 |
| 2008/0263363 | A1* | 10/2008 | Jueneman | G06F 21/32 713/184 |
| 2009/0182627 | A1* | 7/2009 | Otto | G06N 3/12 706/45 |
| 2009/0248553 | A1* | 10/2009 | Taylor | G06Q 10/10 705/32 |
| 2010/0245042 | A1* | 9/2010 | Tsubaki | G06F 21/32 340/5.82 |
| 2011/0082777 | A1* | 4/2011 | Chess | G06Q 10/1091 705/32 |
| 2012/0233044 | A1* | 9/2012 | Burger | G06Q 10/06 705/32 |
| 2012/0321147 | A1* | 12/2012 | Kamiya | G07G 1/0018 382/118 |
| 2013/0004016 | A1* | 1/2013 | Karakotsios | G06K 9/00355 382/103 |
| 2013/0060623 | A1* | 3/2013 | Walker | G06Q 30/0259 705/14.27 |
| 2013/0289873 | A1* | 10/2013 | Mitchell | G06F 17/00 701/482 |
| 2015/0081399 | A1* | 3/2015 | Mitchell | G06Q 10/0639 705/7.38 |
| 2015/0095343 | A1* | 4/2015 | Divilly | H04L 67/28 707/741 |
| 2015/0276412 | A1* | 10/2015 | Cudak | G01C 21/3453 701/465 |
| 2016/0212147 | A1* | 7/2016 | Palin | H04L 63/062 |
| 2016/0284142 | A1* | 9/2016 | Elbling | E06B 11/08 |
| 2016/0330746 | A1* | 11/2016 | Mehrabanzad | H04L 67/142 |
| 2017/0019765 | A1* | 1/2017 | Hoyer | H04B 5/0075 |
| 2017/0076400 | A1* | 3/2017 | Woo | H04L 63/083 |

FOREIGN PATENT DOCUMENTS

| | | | |
|---|---|---|---|
| CN | 20135983 | * | 8/2013 |
| CN | 103903310 | * | 7/2014 |
| JP | 2006243872 | * | 3/2005 |
| KR | 201500847673 | * | 7/2015 |
| WO | WO2009013526 | * | 1/2009 |

* cited by examiner

TIME CARD PUNCHING SYSTEM

CROSS-REFERENCE TO RELATED APPLICATIONS

This application claims the priority benefit of a Hong Kong patent application No. 15109081.4, filed on Sep. 16, 2015. The content of the aforementioned application, including any intervening amendments thereto, is incorporated herein by reference.

FIELD OF THE DISCLOSURE

The present disclosure generally relates to a time card punching system and, in particular relates to a time card punching system comprising a work spot device equipped with Bluetooth smart technology.

BACKGROUND OF THE DISCLOSURE

In the prior art, the traditional time card punching system exists the following limitations: 1. high installation cost: cabling, setup of corresponding PC/server; 2. high administration cost: registration in each time card machine (for business with multiple sites); 3. serial punch card process: each time can have one employee to punch card at one time card machine.

Some enterprise tried to solve the above problems by using mobile app to punch card but face the following problems instead: weak protection from fake GPS and buddy punching.

Therefore, a development for a cost effective, efficient time card punching system for getting rid of the above limitations is required.

SUMMARY OF THE DISCLOSURE

In accordance with one aspect of the disclosure, a time card punching system is disclosed, the time card punching system comprises a cloud-based database, a work spot device, and a smartphone carrying a mobile application; wherein the cloud-based database, the work spot device, and the smartphone perform data communication among each other; the work spot device can be registered with designated GPS and equipped with Bluetooth smart technology; when punching a time card, the mobile application can detect if the employee is within five meters from the work spot device; the mobile application uses a face recognition to prevent buddy punching.

In accordance with an alternative or additional aspect of the disclosure, a time card punching system is disclosed, the time card punching system comprises a cloud-based database, a work spot device, and a smartphone carried a mobile application; wherein the cloud-based database, the work spot device, and the smartphone perform data communication among each other; the work spot device can be registered with designated GPS and equipped with Bluetooth smart technology; when punching a time card, the mobile application can detect if the employee is within five meters from the work spot device; the mobile application uses a face recognition employed by the work spot device; the face recognition is implemented by registering an employee's face, matching employee information in the smartphone against employee information stored in the cloud-based database, daily punching the time card, and changing the employee's face; registering an employee's face comprises inputting email address, password and face recognizing wherein one email address corresponds to one user and the password must have at least eight digits with both character and number, validating the email address and password, storing the email address and password into a CGG cloud database, downloading face from server to the smartphone, and storing encrypted face with email address into the smart phone and MySQL; matching employee information in the smartphone against employee information stored in the cloud-based database comprises adding employer by employee wherein the employer ID is inputted, checked whether it is matched in MySQL and matched email address exists, and confirmed by the employee; daily punching the time card comprises checking face; changing face is used to present buddy punch and comprises showing current face, storing encrypted new face with email address into the smartphone and MySQL of the CGG cloud database, and sending alert to employer; the mobile application comprises algorithm for punching card without internet feasible; the mobile number and GPS are marked in the time card record; the work spot device uses an anti-spoofing algorithm to prevent from changing setting and message sent from the work spot device.

The invention time card punching system allows employer to have a large number of employees perform 'time card punching' at the same time, with buddy punching and fake GPS well prevented by face recognition and wireless sensor which make sure people punching card are within 5 M around WORK SPOT (point at which employer requires employee to punch card). The distance mentioned, 5 M, is configurable by the manufacturer from 1 M to 30 M.

Other advantages and features will be apparent from the following detailed description when read in conjunction with the attached drawings.

BRIEF DESCRIPTION OF THE DRAWINGS

For a more complete understanding of the disclosed time card punching system, reference should be made to the embodiments illustrated in greater detail in the accompanying drawing, wherein.

It should be understood that the drawings are not necessarily to scale and that the disclosed embodiments are sometimes illustrated diagrammatically and in partial views. In certain instances, details which are not necessary for an understanding of the disclosed system, or which render other details difficult to perceive, may have been omitted. It should be understood, of course, that this disclosure is not limited to the particular embodiments illustrated herein.

DETAILED DESCRIPTION OF THE DISCLOSURE

As a new innovative design, the Bluetooth Smart technology consumes only a fraction of the power of Classic Bluetooth radios. Bluetooth Smart extends the use of Bluetooth wireless technology to devices that are powered by small, coin-cell batteries such as watches and toys. Other devices such as sports & fitness, health care, keyboards and mice, beacons, wearable and entertainment devices are enhanced by this version of the technology. In many cases, it makes it possible to operate these devices for more than a year without recharging.

As with previous versions of the specification, the range of the radio may be optimized according to application. The majority of Bluetooth devices on the market today include the basic 30 foot, or 10 meter, range of the Classic Bluetooth radio, but there is no limit imposed by the Specification. With Bluetooth Smart, manufacturers may choose to optimize range to 200 feet and beyond, particularly for in-home sensor applications where longer range is a necessity.

Bluetooth Smart features provides: ultra-low peak, average and idle mode power consumption; ability to run for years on standard coin-cell batteries; lower implementation costs; multi-vendor interoperability; enhanced range.

This enhancement to the Bluetooth Core Specification allows two types of implementation, dual-mode and single-mode. In a dual-mode implementation, Bluetooth low energy functionality is integrated into an existing Classic Bluetooth controller. The resulting architecture shares much of Classic Bluetooth technology's existing radio and functionality resulting in a minimal cost increase compared to Classic Bluetooth technology. Additionally, manufacturers can use current Classic Bluetooth technology (Bluetooth v2.1+EDR or Bluetooth v3.0+HS) chips with the new low energy stack, enhancing the development of Classic Bluetooth enabled devices with new capabilities.

Single-mode chips, which will enable highly integrated and compact devices, will feature a lightweight Link Layer providing ultra-low power idle mode operation, simple device discovery, and reliable point-to-multipoint data transfer with advanced power-save and secure encrypted connections at the lowest possible cost. The Link Layer in these controllers will enable Internet connected sensors to schedule Bluetooth low energy traffic between Bluetooth transmissions.

Data Transfers—Bluetooth Smart (low energy) supports very short data packets (8 octet minimum up to 27 octets maximum) that are transferred at 1 Mbps. All connections use advanced sniff-sub rating to achieve ultra-low duty cycles.

Frequency Hopping—Bluetooth Smart (low energy) uses the adaptive frequency hopping common to all versions of Bluetooth technology to minimize interference from other technologies in the 2.4 GHz ISM Band. Efficient multi-path benefits increase the link budgets and range.

Host Control—Bluetooth Smart (low energy) places a significant amount of intelligence in the controller, which allows the host to sleep for longer periods of time and be woken up by the controller only when the host needs to perform some action. This allows for the greatest current savings since the host is assumed to consume more power than the controller.

Latency—Bluetooth Smart (low energy) can support connection setup and data transfer as low as 3 ms, allowing an application to form a connection and then transfer authenticated data in few milliseconds for a short communication burst before quickly tearing down the connection.

Range—Increased modulation index provides a possible range for Bluetooth Smart (low energy) of over 100 meters.

Robustness—Bluetooth Smart (low energy) uses a strong 24 bit CRC on all packets ensuring the maximum robustness against interference.

Strong Security—Full AES-128 encryption using CCM to provide strong encryption and authentication of data packets.

Topology—Bluetooth Smart (low energy) uses a 32 bit access address on every packet for each slave, allowing billions of devices to be connected. The technology is optimized for one-to-one connections while allowing one-to-many connections using a star topology.

Figure 1:
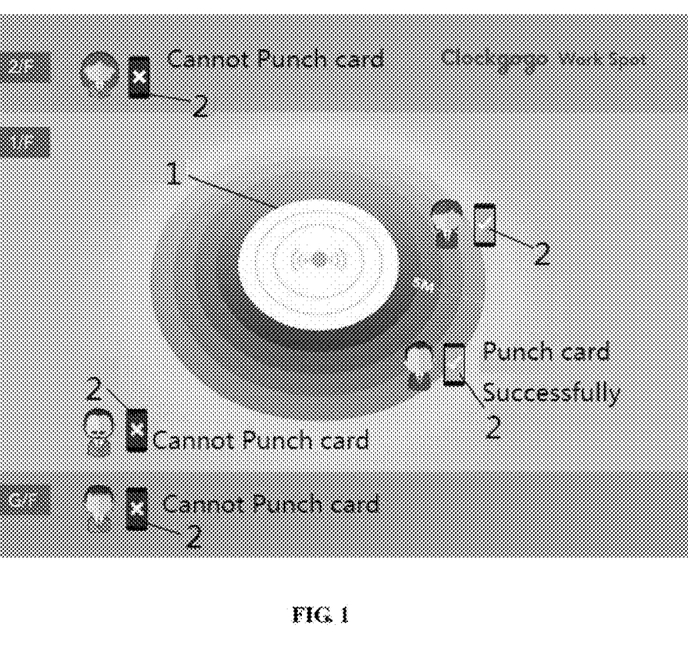
FIG. 1 is an embodiment of a time card punching system constructed in accordance with the teachings of the disclosure.

Referring now to the drawing, and with specific reference to FIG. 1, a time card punching system comprises a cloud-based database (not shown in FIG. 1), a work spot device 1, and a smartphone 2 carried a mobile application. It should be noted that the number of the smartphone 2 being allowed to punch card simultaneously can be changed according to practical application. Further, the cloud-based database, the work spot device 1, and the smartphone 2 perform data communication among each other to implement the time card punching process. The work spot device can be registered with designated GPS and equipped with Bluetooth smart technology.

The invention work spot device 1 uses the anti-spoofing algorithm. Therefore, the work spot device 1 makes work spot different from conventional BLE device using standard UUID. This way, unauthorized user cannot change setting nor message sent from work spot device. That is to say, three additional proprietary "service" is added as below: under non-connectable-mode, such "service" will not be broadcasted. Under connectable-mode, such "service" can be broadcasted even when no API is deployed, under connectable-mode, data of such "service" can only be amended by a proprietary UUID owned by the work spot device manufacturer. In one embodiment, when punching a time card, the mobile application can detect if the employee is within five meters from the work spot device 1; the mobile application uses a face recognition to prevent buddy punching; the face recognition is implemented by registering an employee's face, matching employee information in the smartphone against employee information stored in the cloud-based database, daily punching the time card, and changing the employee's face.

Figure 2:
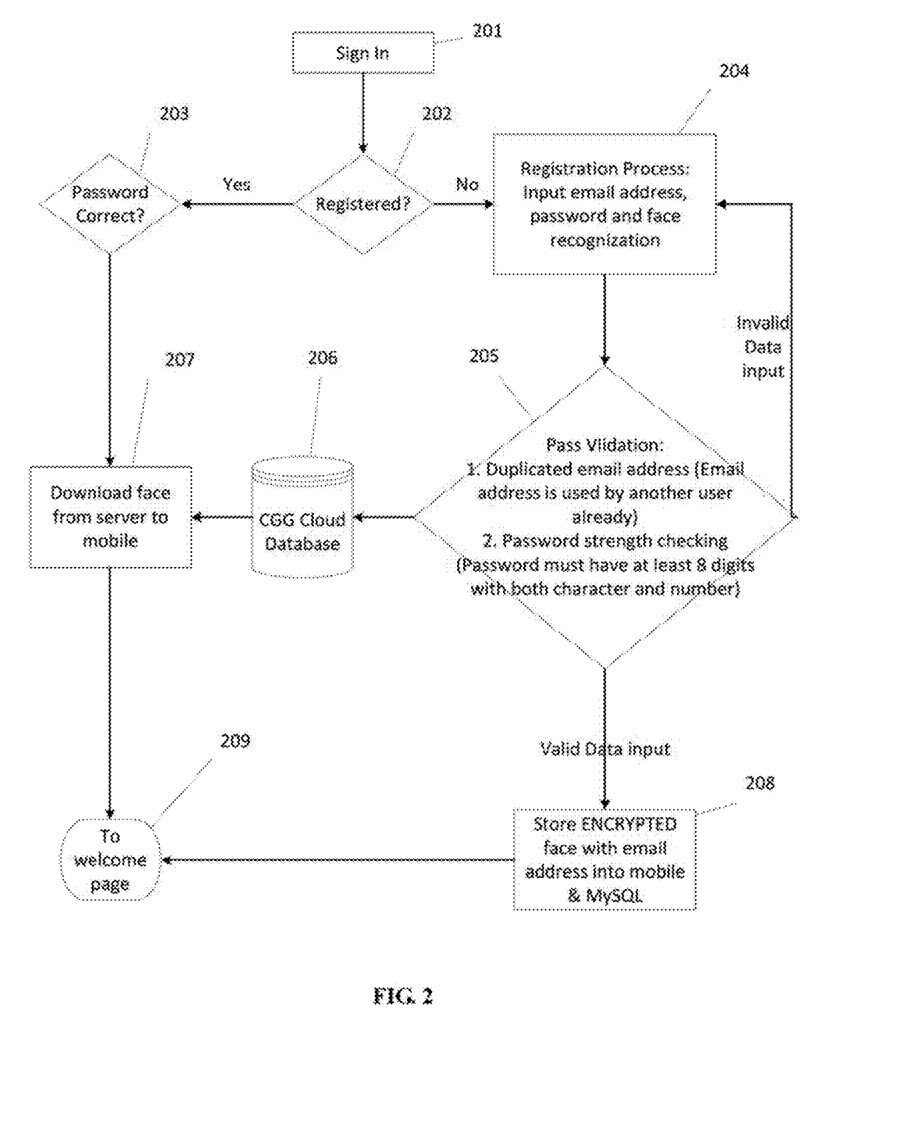
FIG. 2 is a flow chart of an employee registration with face recognition in accordance with the teachings of the disclosure.

Referring now to the drawing, and with specific reference to FIG. 2, registering an employee's face comprises inputting email address, password and face recognizing wherein one email address corresponds to one user and the password must have at least eight digits with both character and number, validating the email address and password, storing the email address and password into a CGG cloud database, downloading face from server to the smartphone, and storing encrypted face with email address into the smart phone and MySQL. In particular, at step 201, the employee uses the smartphone 1 to sign in. At step 202, the system checks whether the employee is registered or not. If the employee is registered, then at step 203 the system checks the password is correct or not. On the contrary, if the employee is not registered, then at step 204 the employee can perform the registration process, i.e. input email address, password and carry out face recognition process. Further, at step 205 data input is validated, i.e. duplicating email address and checking password strength. After passing validation, the input data will be stored in the CGG cloud database. Then at step 207, downloading face from server to mobile. Meanwhile, at step 208 storing encrypted face with email address into the smartphone and MySQL of the cloud-based database. Finally, at step 209 the employee will be guided to welcome page.

Figure 3:
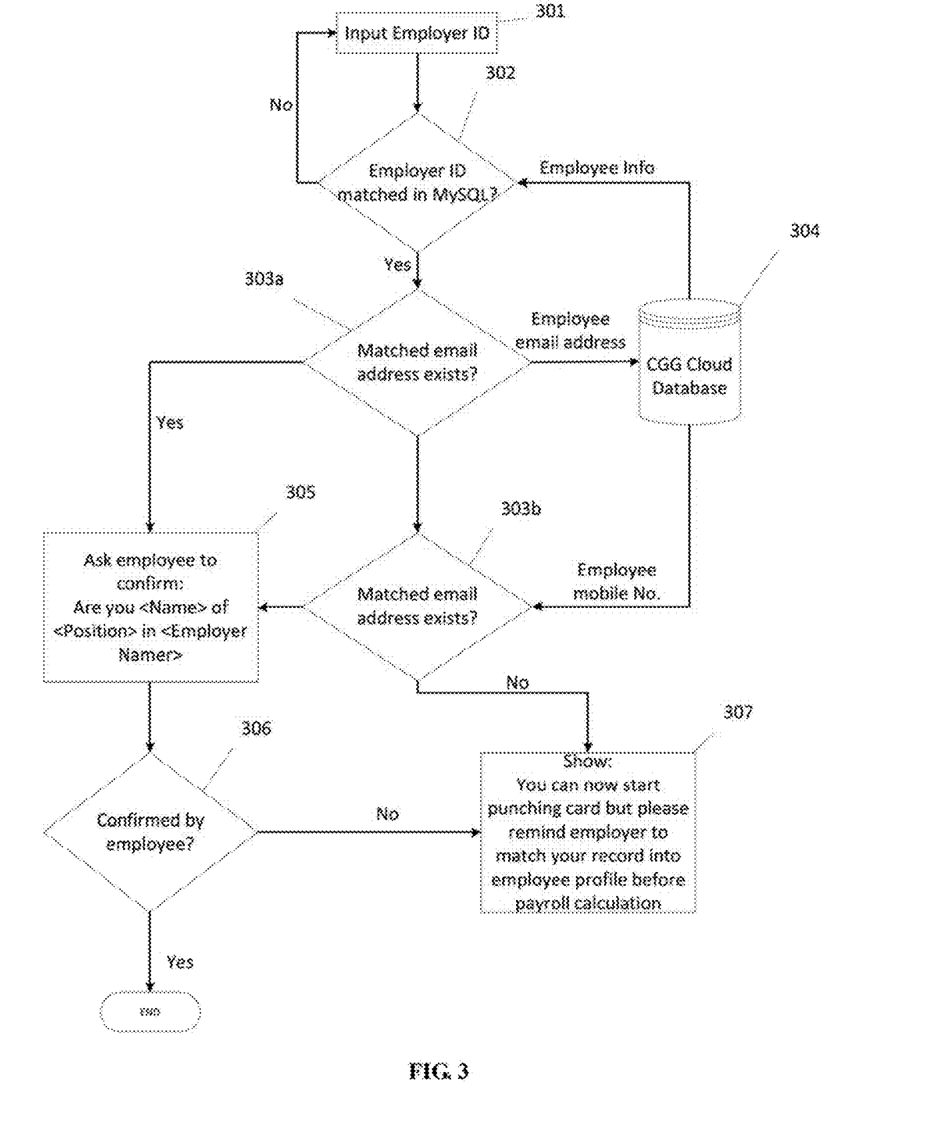
FIG. 3 is a flow chart of adding employer in accordance with the teachings of the disclosure.

Referring now to the drawing, and with specific reference to FIG. 3, matching employee information in the smartphone against employee information stored in the cloud-based database comprises adding employer by employee wherein the employer ID is inputted, checked whether it is matched in MySQL and matched email address exists, and confirmed by the employee. Firstly, at step 301 inputting employer ID. Then, at step 302, the system will check whether the employer ID is matched in MySQL. If there is no employer ID matched, the system will back to step 301 to prompt user to input a valid employer ID. If matched employer ID is found, then at step 303*a* the system further check whether there is any matched email address exists within corresponding employer's employee profile records. If matched email address cannot be found within corresponding employer's employee profile records, the system will go to step 303*b*. At step 303*b*, will check if there is any matched mobile number can be found within corresponding employers employee profile records. If either matched email address or mobile number can be found within corresponding employer's employee profile records (within step 303*a* or 303*b*), at step 305, the employee will be asked to confirm the related information. At step 306 the system will check whether the employee confirms the related information shown in step 305. If both matched email address and mobile number cannot be found within corresponding employer's employee profile records (within step 303*a* and 303*b*), then, at step 307 the system shows "you can now start punching card but please remind employer to match your record into employee profile before payroll calculation".

Figure 4:
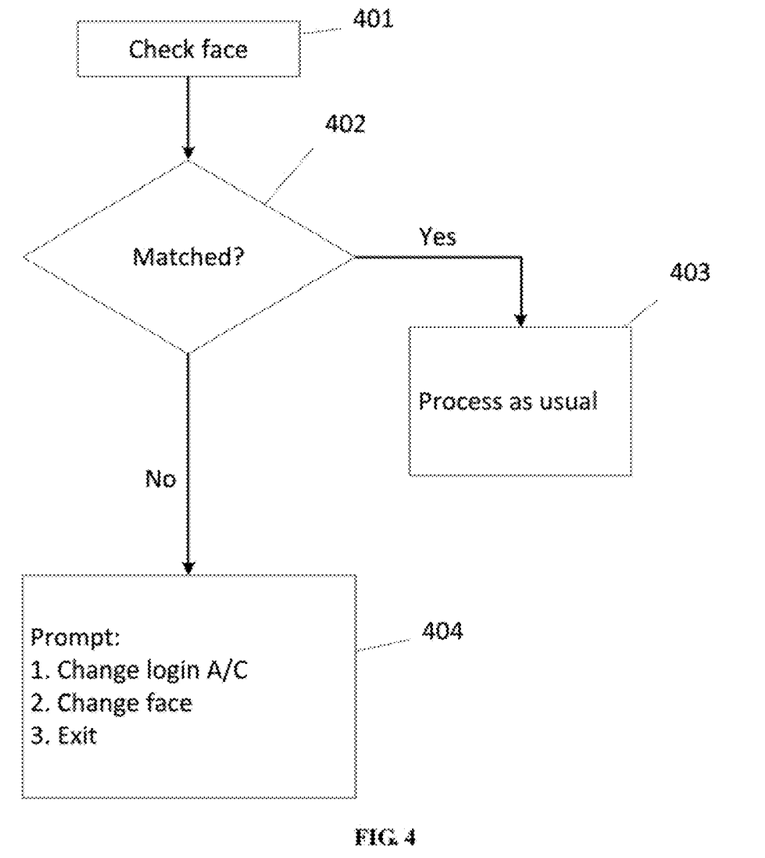
FIG. 4 is a flow chart of punching the time card with face recognition in accordance with the teachings of the disclosure.

Referring now to the drawing, and with specific reference to FIG. 4, daily punching the time card comprises checking face. In particular, at step 401 the system will check face, that is, to capture the face data of the current user. Then at step 402 the system will check whether the face is matched, that is, to match the face data captured against corresponding data stored upon employee registration or change face (see FIG. 2 and FIG. 5). If it is matched, then at step 403 proceed time card punching as usual. On the contrary, at step 404, system will prompt employee to choose changing login A/C, changing face or to exit the time card punching process.

Figure 5:
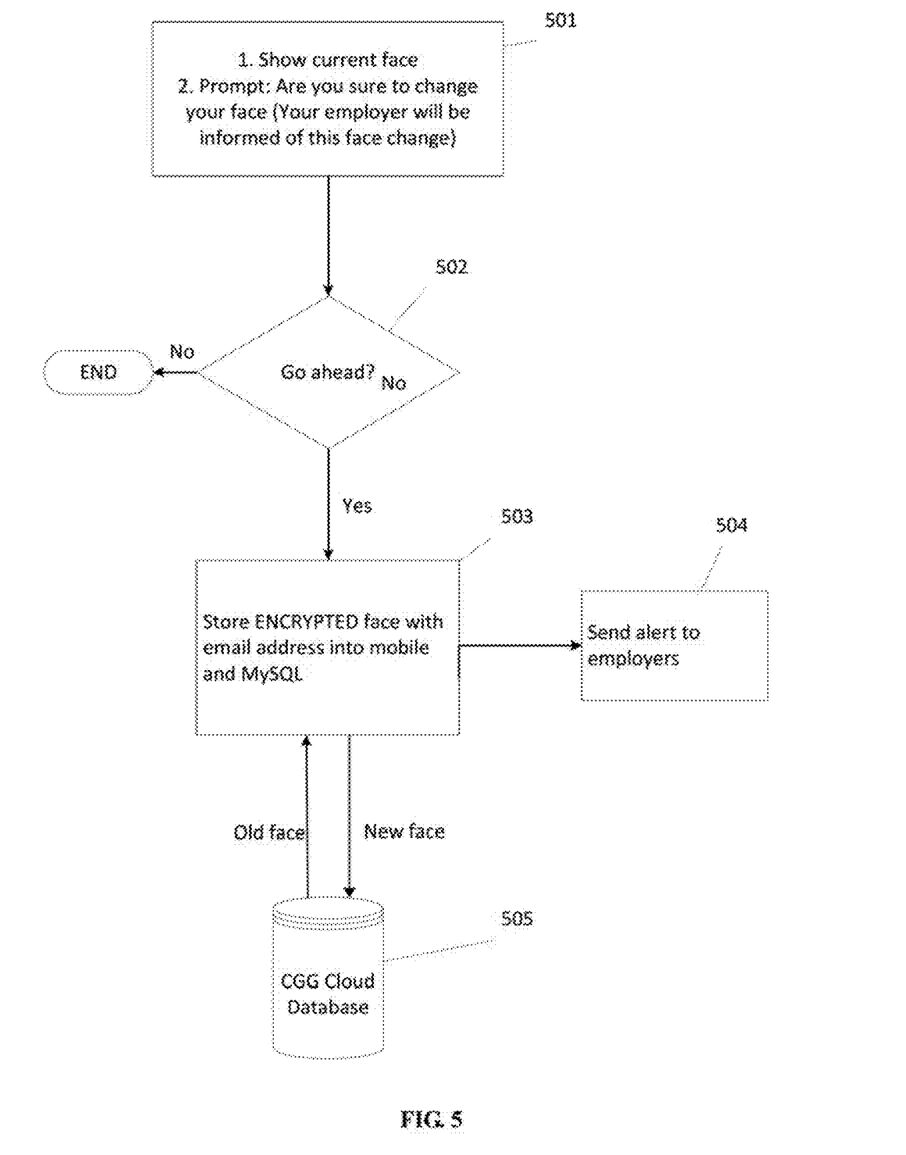
FIG. 5 is a flow chart of changing face in accordance with the teachings of the disclosure.

Referring now to the drawing, and with specific reference to FIG. 5, changing face is used to prevent buddy punch but allow employee to change his/her own face data at his/her own discretion and comprises showing current face, storing encrypted new face with email address into the smartphone and MySQL of the CGG cloud database, and sending alert to employer. In particular, at step 501 showing current face. Then the system indicates that are you sure to change your face (your employer will be informed of this face change). Further, at step 502 the system will ask whether go ahead. If the employee confirms "go ahead", then at step 503 storing encrypted face with email address into mobile and MySQL. Meanwhile, at step 504 sending alert to employers. Finally, at step 505 old face will be deleted from the CGG cloud database and new face will be stored into it.

Further, special algorithm is made to make punching the time card without Internet feasible but still protected by work spot and face recognition (2-level certification). Moreover, the smartphone number and GPS (even when Internet is not available; subject to corresponding smartphone used by an employee) will also be marked in the time card record for employer's further reference.

While only certain embodiments have been set forth, alternatives and modifications will be apparent from the above description to those skilled in the art. These and other alternatives are considered equivalents and within the spirit and scope of this disclosure and the appended claims.

What is claimed is:
1. A time card punching system, comprising:
a cloud-based database,
a work spot device, and
a smartphone carrying a mobile application;
wherein the cloud-based database is interactive communicated with the smartphone, and the smartphone is communicated with the work spot;
the work spot device is configured to be registered with designated GPS and equipped with Bluetooth smart technology; the work spot device has a non-connectable-mode and a connectable-mode; wherein; when the work spot device in the connectable-mode, the work spot device supports connection setup and data transfer as low as 3 ms, allowing the mobile application to form a connection and then transfer authenticated data in few milliseconds for a short communication burst before quickly tearing down the connection;
wherein the cloud-based database is configured to store a first employee information;
the smartphone is configured to store a second employee information;
when punching a time card, the mobile application detects if the employee is within five meters from the work spot device; the mobile application uses a face recognition to prevent buddy punching by registering an employee's face, matching the second employee information against the first employee information, daily punching the time card, and changing the employee's face;
wherein the cloud-based database is a CGG cloud database;
wherein registering an employee's face comprises inputting email address, password and face recognizing, validating the email address and password, storing the email address and password into the CGG cloud database, downloading face from server to the smartphone, and storing encrypted face with email address into the smart phone and MySQL of the CGG cloud database;
wherein matching employee information in the smartphone against employee information stored in the cloud-based database comprises adding employer by employee wherein the employer ID is inputted, checked whether the employer ID is matched in MySQL of the CGG cloud database, and matched email address exists, and confirmed by the employee;
daily punching the time card comprises checking face, wherein the checking face comprises capturing face data of current user, and then matching the face data captured against corresponding data stored upon employee registration or change face to determine whether the face is matched; if the face is matched, then time card punching is performed, if the face is not matched, the system prompts employee to choose changing login A/C, changing face or to exit the time card punching process;
changing employee's face comprises showing current face, storing encrypted new face with email address into the smartphone and MySQL of the CGG cloud database, and sending alert to employer.

2. The time card punching system of claim 1, wherein one email address corresponds to one user and the password must have at least eight digits with both character and number.

3. The time card punching system of claim 1, wherein the mobile application comprises algorithm for punching card without internet feasible; the mobile number and GPS are marked in the time card record.

4. The time card punching system of claim 1, wherein the work spot device uses an anti-spoofing algorithm to prevent from changing setting and message sent from the work spot device.

5. A time card punching system, comprising:
a cloud-based database,
a work spot device, and
a smartphone carrying a mobile application;
wherein the cloud-based database is interactive communicated with the smartphone, and the smartphone is communicated with the work spot;
the work spot device is configured to be registered with designated GPS and equipped with Bluetooth smart technology;
when punching a time card, the mobile application detects if the employee is within five meters from the work spot device;
the mobile application uses a face recognition to prevent buddy punching; the face recognition is implemented by registering an employee's face, matching employee information in the smartphone against employee information stored in the cloud-based database, daily punching the time card, and changing the employee's face;
registering an employee's face comprises inputting email address, password and face recognizing wherein one email address corresponds to one user and the password must have at least eight digits with both character and number, validating the email address and password, storing the email address and password into a CGG cloud database, downloading face from server to the smartphone, and storing encrypted face with email address into the smart phone and MySQL;
matching employee information in the smartphone against employee information stored in the cloud-based database comprises adding employer by employee wherein the employer ID is inputted, checked whether it is matched in MySQL and matched email address exists, and confirmed by the employee;
daily punching the time card comprises checking face, wherein the checking face comprises capturing face data of current user, and then matching the face data captured against corresponding data stored upon employee registration or change face to determine whether the face is matched; if the face is matched, then time card punching is performed, if the face is not matched, the system prompts employee to choose changing login A/C, changing face or to exit the time card punching process;
changing face is used to prevent buddy punch and comprises showing current face, storing encrypted new face with email address into the smartphone and MySQL of the CGG cloud database, and sending alert to employer;
the mobile application comprises algorithm for punching card without internet feasible; the mobile number and GPS are marked in the time card record; the work spot device uses an anti-spoofing algorithm to prevent from changing setting and message sent from the work spot device.

6. A time card punching system, comprising:
a cloud-based database,
a work spot device, and
a smartphone carrying a mobile application;
wherein the cloud-based database is interactive communicated with the smartphone, and the smartphone is communicated with the work spot;
the work spot device is configured to be registered with designated GPS and equipped with Bluetooth smart technology;
when punching a time card, the mobile application detects if the employee is within five meters from the work spot device;
the mobile application uses a face recognition to prevent buddy punching; the face recognition is implemented by registering an employee's face, matching employee information in the smartphone against employee information stored in the cloud-based database, daily punching the time card, and changing the employee's face;
registering an employee's face comprises inputting email address, password and face recognizing wherein one email address corresponds to one user and the password must have at least eight digits with both character and number, validating the email address and password, storing the email address and password into a CGG cloud database, downloading face from server to the smartphone, and storing encrypted face with email address into the smart phone and MySQL;
matching employee information in the smartphone against employee information stored in the cloud-based database comprises adding employer by employee wherein the employer ID is inputted, checked whether it is matched in MySQL and matched email address exists, and confirmed by the employee;
daily punching the time card comprises checking face, wherein the checking face comprises capturing face data of current user, and then matching the face data captured against corresponding data stored upon employee registration or change face to determine whether the face is matched; if the face is matched, then time card punching is performed, if the face is not matched, the system prompts employee to choose changing login A/C, changing face or to exit the time card punching process;
changing face is used to prevent buddy punch and comprises showing current face, storing encrypted new face with email address into the smartphone and MySQL of the CGG cloud database, and sending alert to employer;
the mobile application comprises algorithm for punching card without internet feasible; the mobile number and GPS are marked in the time card record;
the work spot device uses an anti-spoofing algorithm to prevent from changing setting and message sent from the work spot device; the work spot device supports data packets of 8 octet to 27 octets that are transferred at 1 Mbps and uses advanced sniff-sub rating to achieve ultra-low duty cycles; the work spot device uses the adaptive frequency hopping common to all versions of Bluetooth technology to minimize interference from other technologies in the 2.4 GHz ISM Band and increase the link budgets and range; the work spot device places a significant amount of intelligence in the controller, which allows the host to sleep for longer periods of time and be woken up by the controller only when the host needs to perform action;

the work spot device supports connection setup and data transfer as low as 3 ms, allowing the mobile application to form a connection and then transfer authenticated data in few milliseconds for a short communication burst before quickly tearing down the connection;

the work spot device uses a strong 24 bit CRC on all packets ensuring the maximum robustness against interference; the work spot device uses full AES-128 encryption to provide strong encryption and authentication of data packets; the work spot device uses a 32 bit access address on every packet for each slave, allowing billions of devices to be connected; the work spot device has non-connectable-mode and connectable-mode; the work spot device is powered by small, coin-cell batteries.

* * * * *